United States Patent
Young et al.

(10) Patent No.: US 11,370,468 B2
(45) Date of Patent: Jun. 28, 2022

(54) MODULAR STROLLER PLATFORM

(71) Applicants: David Young, Lucas, TX (US); Audrey Young, Lucas, TX (US)

(72) Inventors: David Young, Lucas, TX (US); Audrey Young, Lucas, TX (US)

( * ) Notice: Subject to any disclaimer, the term of this patent is extended or adjusted under 35 U.S.C. 154(b) by 0 days.

(21) Appl. No.: 16/894,813

(22) Filed: Jun. 7, 2020

(65) Prior Publication Data
US 2020/0385043 A1 Dec. 10, 2020

Related U.S. Application Data

(60) Provisional application No. 62/857,825, filed on Jun. 6, 2019.

(51) Int. Cl.
| | | |
|---|---|---|
| *B62B 7/14* | (2006.01) | |
| *B62B 9/12* | (2006.01) | |
| *B62B 7/00* | (2006.01) | |
| *B62B 7/10* | (2006.01) | |
| *B62B 9/20* | (2006.01) | |
| *B62B 9/08* | (2006.01) | |

(52) U.S. Cl.
CPC ............... *B62B 7/008* (2013.01); *B62B 7/10* (2013.01); *B62B 7/145* (2013.01); *B62B 9/08* (2013.01); *B62B 9/12* (2013.01); *B62B 9/20* (2013.01)

(58) Field of Classification Search
CPC .. B62B 7/008; B62B 7/10; B62B 7/06; B62B 7/08; B62B 7/142; B62B 7/14; B62B 9/102; B62B 9/12; B62B 7/145; B62B 9/08; B62B 9/20; B60N 2/2848
See application file for complete search history.

(56) References Cited

U.S. PATENT DOCUMENTS

| | | | | |
|---|---|---|---|---|
| 6,209,892 | B1* | 4/2001 | Schaaf | B62B 7/145 |
| | | | | 280/47.38 |
| 6,250,653 | B1* | 6/2001 | Worrell | B62B 7/04 |
| | | | | 280/47.38 |
| 9,849,903 | B1* | 12/2017 | Lai | B62B 7/142 |
| 9,944,305 | B2* | 4/2018 | Lee | B62B 9/102 |
| 10,207,731 | B2* | 2/2019 | Taylor | B62B 7/008 |
| 10,449,987 | B2* | 10/2019 | Gibson | B62B 9/28 |
| 10,899,377 | B2* | 1/2021 | Eggert-Crowe | B62B 9/28 |
| 2010/0013281 | A1* | 1/2010 | Chen | B62B 9/102 |
| | | | | 297/243 |
| 2012/0169021 | A1* | 7/2012 | Jane Santamaria | B62B 7/14 |
| | | | | 280/47.35 |
| 2014/0345980 | A1* | 11/2014 | Shellenberger | B62B 9/085 |
| | | | | 188/20 |
| 2016/0016601 | A1* | 1/2016 | Velichko | A47D 13/063 |
| | | | | 280/30 |

* cited by examiner

*Primary Examiner* — John D Walters
(74) *Attorney, Agent, or Firm* — Nelson Patent Law

(57) ABSTRACT

The present invention is a modular stroller platform for carrying multiple small children. The invention enables secure mounting of three seats or carriers in a compact arrangement, giving each child sufficient space without making the stroller unnecessarily difficult to move. Because of its modular design, other accessories, including a wagon body, may be mounted in place of the seats.

17 Claims, 5 Drawing Sheets

MODULAR STROLLER PLATFORM

CROSS-REFERENCE TO RELATED APPLICATIONS

The present application claims the benefit of provisional patent application Ser. No. 62/857,825, filed Jun. 6, 2019, by the present inventors. The provisional application is incorporated by reference in its entirety.

FIELD OF INVENTION

The present invention relates to strollers, in particular strollers capable of carrying two or more children.

BACKGROUND AND RELATED ART

Standard strollers are typically designed to accommodate one child in either a seat or bassinet. For parents having two or more young children, as may be the case for twins or triplets, it may be desirable to have one stroller which can accommodate multiple children.

Previous efforts by others have introduced stroller designs capable of carrying two or more children. Past designs have positioned multiple carriers in either a fore-aft, such as U.S. Pat. No. 6,676,140 issued in 2002 to Gondobintoro, or side-by-side orientation, such as U.S. Pat. No. 1,707,186 issued in 1928 to Hall. Fore-aft designs can be extremely long, thus sacrificing the ability to steer effectively. Side-by-side designs can be very wide, complicating passage through doorways and other narrow spaces. Both schemes often result in strollers that are large and heavy, making storage and transport difficult. The shortcomings of typical two-child designs are amplified when expanding them further to carry three children.

Strollers are typically designed to only accommodate a small and fixed number of stroller seats or bassinets in a fixed configuration. Further, strollers typically only accommodate seats or bassinets. If the user desires other means for transporting children or items, for example a wagon, they must purchase another device. It is desirable to have a modular stroller, in which seats may be added or removed, while still preserving much of the handling and stability of a smaller stroller. Furthermore, it is desirable to have a stroller in which the seats may be replaced by other carrying means, such as a wagon.

Ultimately, there remains a need for a stable, maneuverable and high capacity stroller exhibiting a high degree of modularity.

SUMMARY OF INVENTION

The present invention overcomes the limitations of previous stroller designs by way of a unique modular arrangement of stroller frame and attachable accessory modules. The stroller frame comprises three or more sets of mounting points, to which a stroller seat or bassinet may be attached. Each mounting point set may have a left and a right mounting point, positioned approximately side by side. The mounting point sets may be positioned in a "lambda"-shaped orientation with an upper mounting point location, a lower rear mounting point location and a lower front mounting point location. Three mounting point sets may be used simultaneously, permitting three children to be carried at once (for example, by attaching one seat or carrier per mounting point set). The stroller may also be used with only two carriers, which may be located at the lower front and lower rear mounting points or, preferably, on a lower front set of mounting points and an upper set of mounting points, without a significant loss in stability or steering performance. An optional central mounting point provides a highly stable and balanced location for a carrier when there is only one child, providing the stroller with enhanced balance and stability.

The modular mounting points of the present invention allow the attachment of accessories which enhance the customizability and utility of the stroller. In particular, a wagon attachment may be provided for the stroller frame, connecting at two or more of the mounting points.

DETAILED DESCRIPTION

Figure 1:
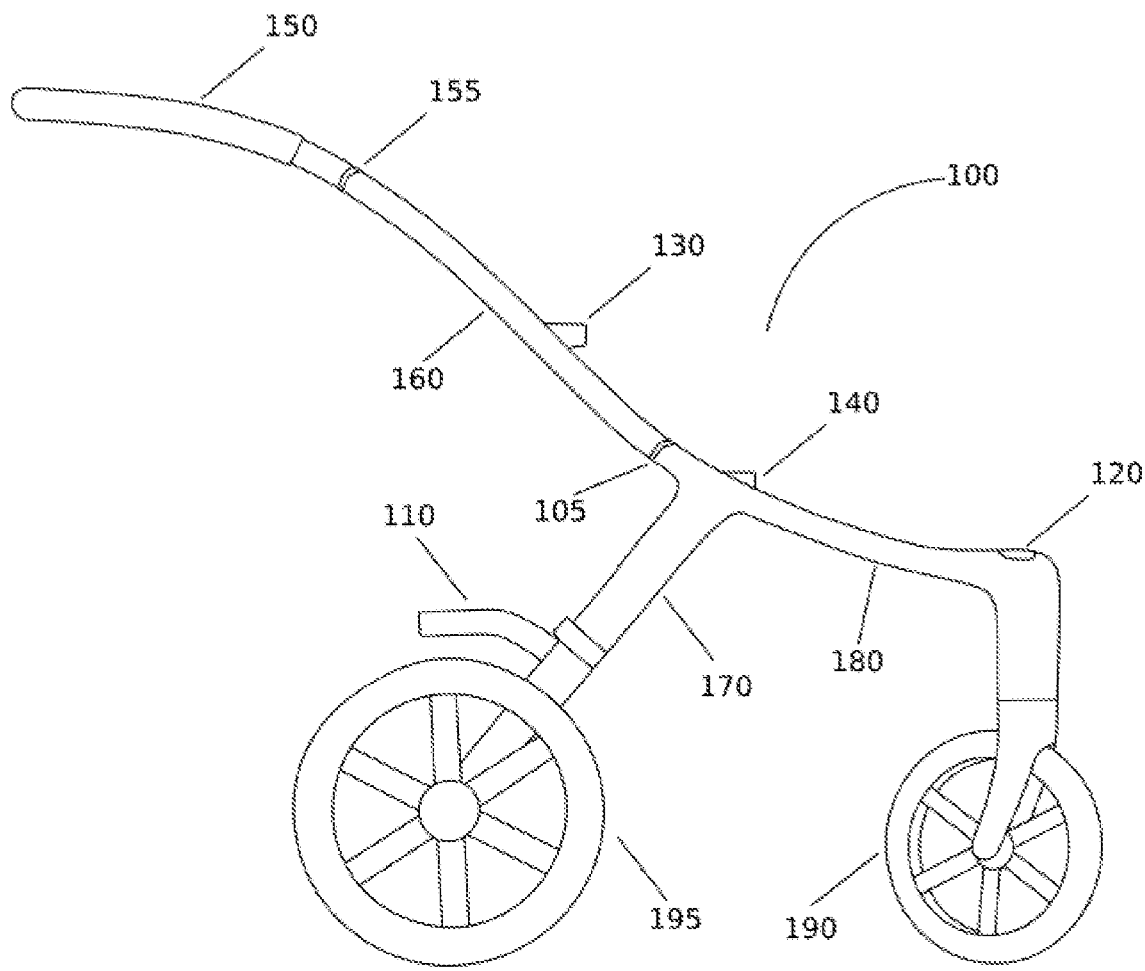
FIG. 1 is a side view of a stroller according to the present invention with no attachments.
Figure 2:
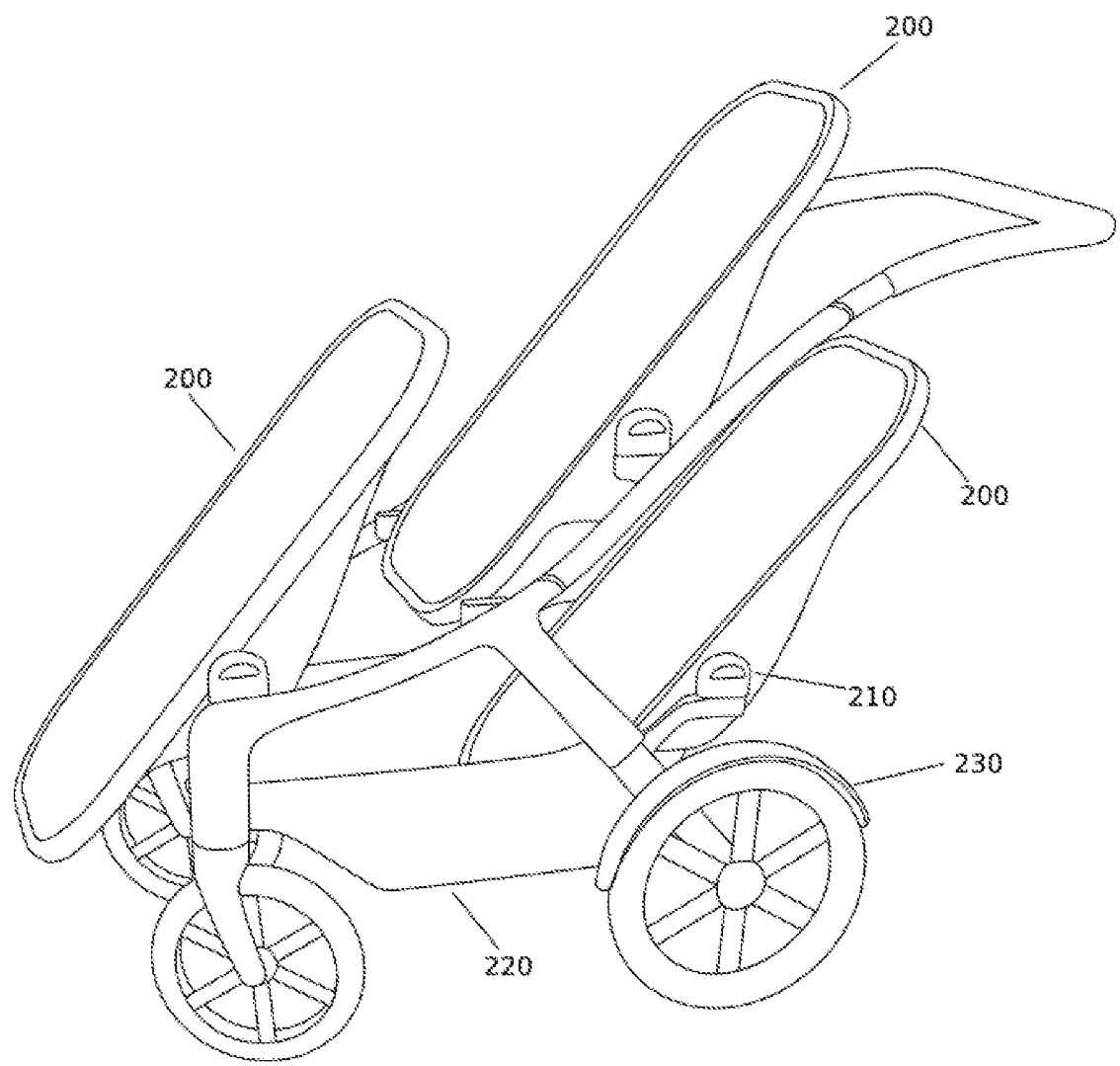
FIG. 2 is a perspective view of a stroller with three seats attached.

Generally, the stroller comprises a stroller frame 100, to which seats 200 and accessories may be attached. The stroller comprises at least three sets of mounting points: an upper set 130, a lower front set 120, a lower rear set 110. Sometimes these will simply be referred to as mounting points. The stroller may further comprise a central set of mounting points 140, which may be positioned near the pivot point 105 of the stroller collapsing mechanism. It is envisioned that the stroller may carry three children simultaneously using the upper, lower front, and lower rear mounting points. The stroller may comprise a front wheel or set of wheels 190 and a rear set of wheels 195, located at the front and rear of the stroller. The front set of wheels may be pivotally connected to the frame, at the front wheel stays 180 to enable easy changes in orientation or direction of travel. A front wheel connector 350 (or strut) may connect one side of the stroller frame to the other. Similarly, the rear set of wheels may be connected to a rear wheel connector 340. The front and rear wheel connectors may form an additional means of attaching accessories, such as a storage basket 220 or standing board. The stroller frame may further comprise additional accessory mounting points. A variety of accessories and attachments may be configured for use with the mounting points on the frame. The stroller frame may comprise pivots 105, 430 which may allow the frame to collapse for more efficient storage.

Preferably, there would be few if any permanent horizontal (left to right) supports in the stroller chassis/frame beyond the handle. This permits a wider range of accessory configurations. Notably, accessories that attach to both left and right mounting points may add rigidity to the frame. Alternatively, a removable strut may be used to attach between pairs of unused mounting points when doing so would not place the strut in the way.

Figure 4:
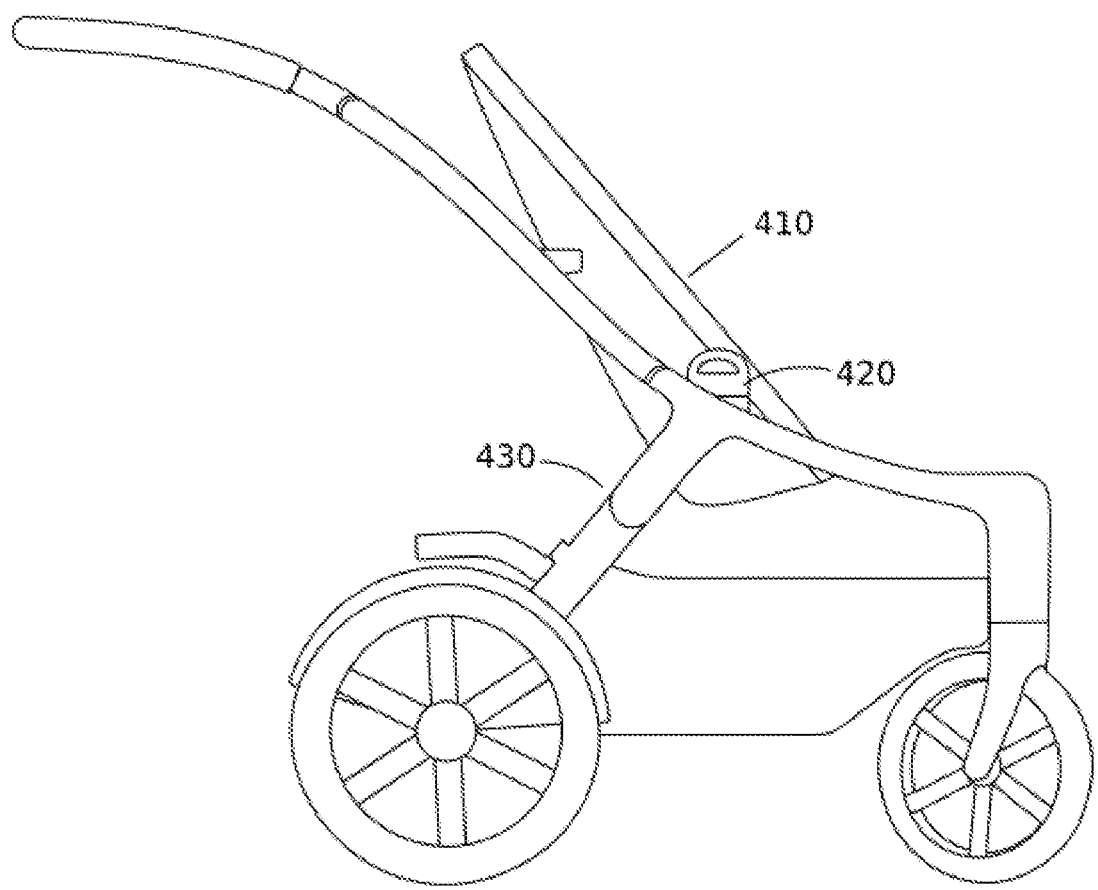
FIG. 4 is a side view of a stroller with a single seat arrangement.

The orientation of the mounting points is key, as it allows up to three seats 200 to be attached to the stroller compactly. The orientation also allows the stroller to be used with fewer than three seats while maintaining optimal weight distribution, and thus optimal handling characteristics. For instance, two seats may be attached using the lower rear and lower front mounting points. A central mounting point may be used to configure the stroller for a single seat as is shown in FIG. 4. Preferably, the mounting points may be placed in a configuration resembling the Greek alphabet lower case letter 'lambda.' This configuration might also be described as an 'A' or even a triangle, depending on the particular implementation. The stroller frame may comprise a set of rear wheel stays, a set of front wheel stays, and a set of handle stays. One set of mounting points may be placed each on the rear wheel stays, front wheel stays, and handle stays. An additional set of mounting points may be placed near the junction of the stays.

Mounting points, generally, can be brackets, clips, clamps, indents or other features on the stroller frame that enable an accessory such as a seat to securely attach to the stroller. Preferably, mounting points are arranged in matching sets on the frame, with a left and right point forming a set. The sets may be referenced by their fore/aft and height positions. While large accessories will typically, but not necessarily, connect to both mounting points within a set, it may be beneficial to attach smaller accessories to just one mounting point. In some situations, it may also be desirable to connect larger accessories in a staggered manner, for example using a front and rear right mounting point with a central left mounting point.

Figure 3:
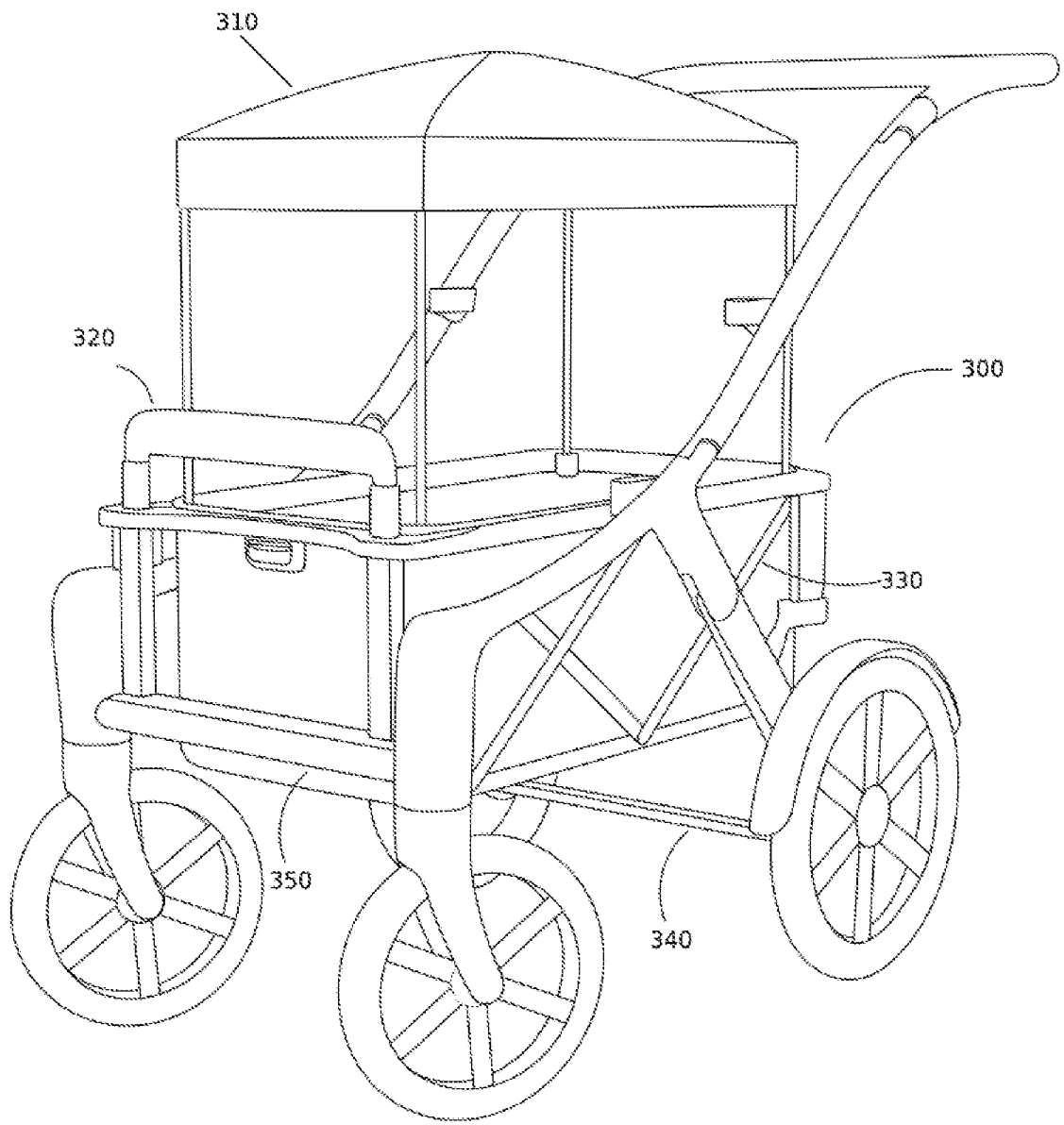
FIG. 3 is a perspective view of a stroller with a wagon attachment.

A wagon body 300 may be fixed to the stroller by two or more sets of mounting points, as shown in FIG. 3. The wagon body may attach to the lower rear and lower front mounting points. A handle 320 may extend from the front of the wagon body such that the wagon may be pulled as an alternative to pushing using the standard handle. Such a handle may pivot vertically, horizontally, or both. An accordion style collapsing structure 330 could be used to enable the wagon to collapse for storage. Here, the stroller frame provides the wheels for the wagon, enabling maneuverability and suspension benefits not commonly associated with wagons. Such a wagon could carry several children as well as various items; for example, stuffed animals, food items, clothing, and so on.

The height of the stroller handle may be adjustable. This may be achieved, for example, by providing a lockable pivot point 155 on the handle stay, enabling the handle to pivot up or down or in or out. This allows the handle to be at a comfortable position for different users. The stroller handle may be wrapped in leather, durable foam or another material that is comfortable to grip. Preferably, the handle material would be removable for cleaning or replacement.

Figure 5:
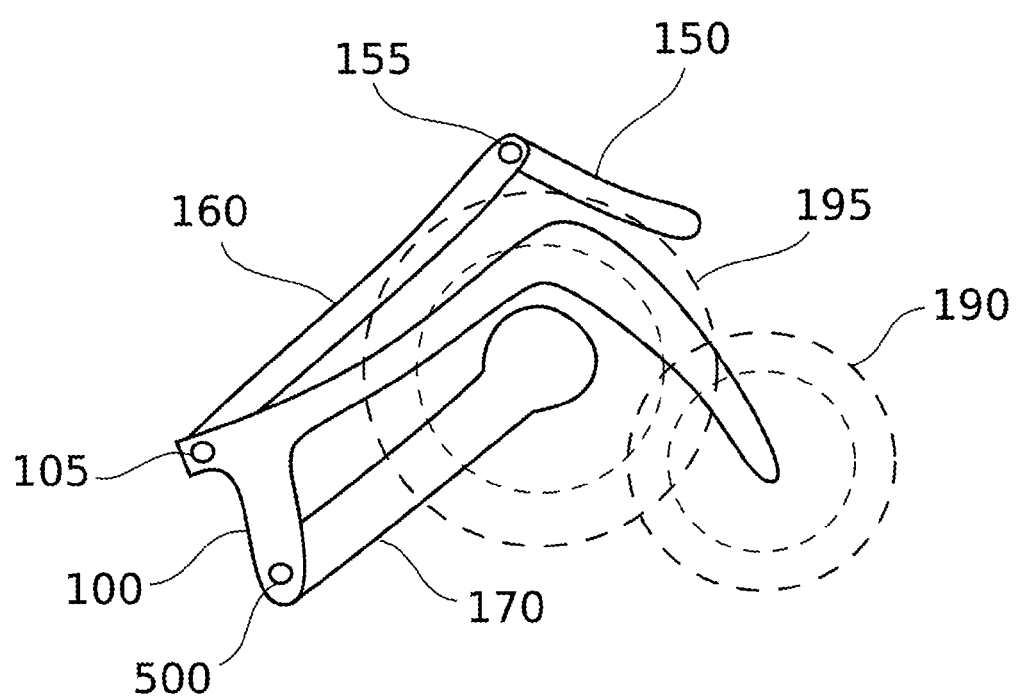
FIG. 5 is a side view of a stroller in a folded configuration.

Preferably, the stroller is collapsible to allow compact storage or transportation. FIG. 5 shows one embodiment of a folding mechanism for said stroller. Pivots 155, 105, 430/500 enable the otherwise substantially rigid frame to fold. The back wheels 195 may pivot under the frame 100 to be near the front wheels 190, and the handle 150 may pivot over the frame. Alternatively, the stroller may collapse by pivoting such that the rear wheel stays are substantially parallel to the front wheel stays or handle stays. Many collapsing configurations are possible, and selecting one is a trade-off between ease of manufacturing and use, and space savings. The examples given are meant to be illustrative, not limiting.

Preferably, the stroller may comprise replaceable wheels. Wheels may be changed based on the intended use case of the stroller. For example, the stroller may be adapted to be suitable for jogging by the use of larger diameter wheels, which roll over rough surfaces more easily. Similarly, the stroller may be adapted to be more suitable for off-road use by the use of larger width wheels. In some embodiments, the stroller may have a three-wheel configuration, comprising a pair of rear wheels and a single front wheel, which may attach to the front wheel axle.

In some preferred embodiments, the stroller would comprise large diameter, pneumatic wheels for improved ride quality. The stroller may also employ a suspension system for further vibration damping, improving ride quality. Many suspension designs are compatible with the present invention, including, for example, those that incorporate leaf springs, shocks, springs and/or elastomers.

Preferably, the frame would be constructed from a strong but lightweight material. Some embodiments may use traditional stroller materials, such as steel, aluminum or plastic for the frame. Other materials, such as carbon fiber, may have superior properties (in terms of strength and weight). Selecting a recycled or renewable material for the frame body may be desirable for reducing the impact on the environment. A typical embodiment will make use of a number of materials as different components will have different strength, weight and form requirements.

In some embodiments, the stroller may include a braking system, allowing the user to go downhill without fear of losing control of the stroller's speed. Such a braking system may be a disc brake, drum brake, rim brake, electronic/regenerative or other brake. The stroller may also contain a mechanism to hold the brake in the active position, such as a parking brake.

The stroller may comprise an additional storage area at its bottom. For example, a storage basket 220 extending from the rear wheel axle to the front wheel axle. A storage box may also be provided to fit the mounting points on the stroller, providing additional storage when fewer than three seats are attached to the stroller frame. Similarly, an attachment for a pet carrier may be provided to fit the mounting points, enabling a small animal to be transported on the stroller alongside one or two children.

The stroller may accommodate a bassinet attached to the mounting points. Optionally, a sun shade 310 or rain fly may be mounted on the frame, a carrier or one of the other accessories, providing a shield from ultraviolet radiation or rain. In some embodiments, a tray may be integrated or attached to the frame or accessory. The tray may be formed to provide a secure holder for portable devices such as phones and tablets. Optionally, adapters 420 may be provided for accessories such as car seats 410. This allows the use of different brands of seats and carriers with different latching mechanisms with the stroller.

The stroller may comprise a 'standing board' accessory. Such an accessory may be a flat extension attached to the front or rear wheel axle, allowing a child to stand on the board rather than sit in a seat. Thus, an additional child may be accommodated by the stroller, particularly one that is old enough to walk and not need a stroller but may become tired on longer trips.

Preferably, the attachments and accessories for the stroller would be made of durable materials that are easily cleaned (by machine washing, for example). The specifics of the materials used and the construction would depend on the type of accessory. Some compatible accessories may already be available for purchase. One theme of the present invention is to provide convenient attachment areas enabling a high degree of customization with respect to accessories and mounting locations.

We claim:

1. A modular stroller platform comprising:
   a frame, said frame comprising front wheel stays, rear wheel stays, and handle stays, whereby said front wheel stays, rear wheel stays, and handle stays meet at a single junction per side;
   a lower front set of mounting points on said front wheel stays;
   a lower rear set of mounting points on said rear wheel stays;
   and an upper rear set of mounting points on said handle stays;
   whereby three child carrier accessories may be mounted simultaneously, one on each of said lower front set of mounting points, said lower rear set of mounting points and said upper rear set of mounting points.

2. The platform of claim 1, wherein said mounting points are located on said frame in a generally lambda-shaped orientation.

3. The platform of claim 1, further comprising a central set of mounting points.

4. The platform of claim 1, further comprising an accessory said accessory being operable to selectively attach to said frame using at least one set of said mounting points.

5. The platform of claim 4, wherein said accessory is a wagon accessory.

6. The platform of claim 4, wherein said accessory is a storage box accessory.

7. The platform of claim 4, wherein said accessory is a pet carrier accessory.

8. The platform of claim 4, wherein said accessory is a bassinet accessory.

9. The platform of claim 1, further comprising mounting point adapters for car seats.

10. The platform of claim 1, further comprising a standing board.

11. The platform of claim 1, further comprising a tray.

12. The platform of claim 1, further comprising a telescopic and/or tiltable handle.

13. The platform of claim 1, further comprising a brake.

14. The platform of claim 1, further comprising at least one pneumatic tire.

15. The platform of claim 1, further comprising a suspension system.

16. The platform of claim 1, wherein said frame is hinged to enable pivoting of at least one frame component, reducing space required for storage.

17. The platform of claim 1, further comprising three child carrier accessories.

* * * * *